(12) United States Patent
Su et al.

(10) Patent No.: US 12,510,933 B2
(45) Date of Patent: Dec. 30, 2025

(54) DISPLAY MODULE AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Jingchang Su, Beijing (CN); Xin Bi, Beijing (CN); Jianjun Wu, Beijing (CN); Wen Huang, Beijing (CN); Jiahua Wang, Beijing (CN); Hao Cheng, Beijing (CN); Qiang Fan, Beijing (CN); Zhenyu Sun, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 211 days.

(21) Appl. No.: 18/276,259

(22) PCT Filed: Aug. 16, 2022

(86) PCT No.: PCT/CN2022/112880
§ 371 (c)(1),
(2) Date: Aug. 8, 2023

(87) PCT Pub. No.: WO2024/036493
PCT Pub. Date: Feb. 22, 2024

(65) Prior Publication Data
US 2025/0021135 A1    Jan. 16, 2025

(51) Int. Cl.
*G06F 1/16* (2006.01)
*H05K 1/18* (2006.01)

(52) U.S. Cl.
CPC ........... *G06F 1/1656* (2013.01); *H05K 1/189* (2013.01); *H05K 2201/10128* (2013.01)

(58) Field of Classification Search
CPC ...................................................... G06F 1/1683
See application file for complete search history.

(56) References Cited

U.S. PATENT DOCUMENTS 5,007,849 A * 4/1991 Shinoda ................. H01R 35/02
439/165
5,611,444 A 3/1997 Garby et al.
(Continued)

FOREIGN PATENT DOCUMENTS

CN     1133584 A    10/1996
CN     1614974 A    5/2005
(Continued)

*Primary Examiner* — Adrian S Wilson
(74) *Attorney, Agent, or Firm* — XSENSUS LLP

(57) ABSTRACT

Provided is a display module. The display module includes: a display panel, a first printed circuit board, and a flexible printed circuit board; wherein the display panel is electrically connected to the first printed circuit board, the first printed circuit board is disposed at a back of the display panel, and the flexible printed circuit board includes a first connecting portion, a second connecting portion, and a flexible connecting structure, wherein the flexible connecting structure includes a plurality of stacked connecting bands, two ends of the flexible connecting structure are connected to the first connecting portion and the second connecting portion respectively, the first connecting portion is connected to the first printed circuit board, and the second connecting portion is configured to be connected to the host.

19 Claims, 12 Drawing Sheets

(56) References Cited

U.S. PATENT DOCUMENTS

| | | | |
|---|---|---|---|
| 8,228,678 B2 * | 7/2012 | Hasegawa | H04M 1/0249 |
| | | | 361/755 |
| 9,544,408 B2 * | 1/2017 | Liang | H04M 1/0274 |
| 2005/0124392 A1 | 6/2005 | Jeong | |
| 2006/0007644 A1 | 1/2006 | Huilgol et al. | |
| 2008/0132301 A1 | 6/2008 | Kim et al. | |
| 2016/0366256 A1 * | 12/2016 | Liang | H04B 1/385 |

FOREIGN PATENT DOCUMENTS

| | | |
|---|---|---|
| CN | 2754119 Y | 1/2006 |
| CN | 101221821 A | 7/2008 |
| CN | 201349227 Y | 11/2009 |
| CN | 101887772 A | 11/2010 |
| CN | 102354480 A | 2/2012 |
| CN | 206038019 U | 3/2017 |
| CN | 109739303 A | 5/2019 |
| CN | 112576961 A | 3/2021 |
| CN | 113038712 A | 6/2021 |
| JP | 2002-232541 A | 8/2002 |
| TW | I317917 B | 12/2009 |
| WO | 2007/072234 A1 | 6/2007 |

\* cited by examiner

DISPLAY MODULE AND DISPLAY DEVICE

CROSS-REFERENCE TO RELATED APPLICATION

This application is a U.S. national phase application based on PCT/CN2022/112880, filed on Aug. 16, 2022, the disclosure of which is incorporated herein by reference in its entirety.

TECHNICAL FIELD

The present application related to the field of display technologies, and in particular, relates to a display module and a display device.

BACKGROUND

The display device is a device having an image display function. The display device may be a product such as a phone, a tablet computer. For example, the phones often need to be placed horizontally or vertically during use to control the phone to be switched as a horizontal or vertical screen.

SUMMARY

Embodiments of the present disclosure provide a display module and a display device. The technical solution is as follows.

Embodiments of the present disclosure provide a display module, configured to be rotatably connected to a host, the display module including: a display panel, a first printed circuit board and a flexible printed circuit board; wherein the display panel is electrically connected to the first printed circuit board, the first printed circuit board is disposed at a back of the display panel, and the flexible printed circuit board includes: a first connecting portion, a second connecting portion, and a flexible connecting structure, wherein the flexible connecting structure includes a plurality of stacked connecting bands, two ends of the flexible connecting structure are connected to the first connecting portion and the second connecting portion respectively, the first connecting portion is connected to the first printed circuit board, and the second connecting portion is configured to be connected to the host.

In some embodiments of the present disclosure, each of the connecting bands has a first side face and a second side face, a thinning groove is disposed in the first side face of at least one of the connecting band, and the first side face of the connecting bands is opposite to the second side face of ab adjacent connecting band in a stacking direction.

In some embodiments of the present disclosure, a ratio of a length of the thinning groove to a length of the connecting band ranges from 0.6 to 0.9.

In some embodiments of the present disclosure, a width of the thinning groove is equal to a width of the connecting band.

In some embodiments of the present disclosure, a ratio of a depth of the thinning groove to a thickness of the connecting band ranges from 0.3 to 0.7.

In some embodiments of the present disclosure, in response to the flexible printed circuit board being in an unfolded state, the connecting bands are spaced apart in parallel, and each of the connecting bands has a same shape and area.

In some embodiments of the present disclosure, the flexible connecting structure is linear, and the flexible connecting structure runs through a line connecting a geometric center of the first connecting portion to a geometric center of the second connecting portion.

In some embodiments of the present disclosure, the flexible connecting structure is in a fan ring shape, and a middle region of the flexible connecting structure is outside a line connecting a geometric center of the first connecting portion to a geometric center of the second connecting portion.

In some embodiments of the present disclosure, the first connecting portion and the second connecting portion are formed by folding by connecting side plates; in response to the flexible printed circuit board being in an unfolded state, a length direction of the connecting side plate is perpendicular to an arrangement direction of the first connecting portion and the second connecting portion, and the connecting side plate has a plurality of folding regions sequentially connected in the length direction, the plurality of folding regions are in one-to-one correspondence to the plurality of connecting bands, and each of the folding regions is connected to a corresponding connecting band thereof; and the plurality of folded regions are stacked in response to the flexible printed circuit board being in a folded state.

In some embodiments of the present disclosure, a ratio of a width of the connecting band to a width of the folded region to which the connecting band is connected ranges from 0.3 to 0.7.

In some embodiments of the present disclosure, each of the first connecting portion and the second connecting portion further includes a connecting structure, and the connecting structure wherein the connecting band are disposed on opposite sides of the connecting side plate respectively; and the display module further includes a connector, disposed on the connecting structure of the second connecting portion, wherein the connector is configured to be connected to a second printed circuit board within the host.

In some embodiments of the present disclosure, the connecting structure includes a connecting plate and two clamping plates spaced apart in parallel, wherein the connecting plate is disposed between the two clamping plates and two sides of the connecting plate are connected to the two clamping plates respectively, the connector is disposed between the two the clamping plates and is connected to one of the two clamping plates, and the second printed circuit board is disposed between the two clamping plates.

In some embodiments of the present disclosure, the flexible printed circuit board includes a first conductive layer, an insulative layer and a second conductive layer that are stacked sequentially in a thickness direction; and at least part of a region of the connecting structure of the first conductive layer or the second conductive layer is in a mesh shape.

In some embodiments of the present disclosure, the flexible printed circuit board further includes a protective layer, wrapped around the plurality of connecting bands.

In some embodiments of the present disclosure, the first printed circuit board and the flexible printed circuit board are integrally formed.

In some embodiments of the present disclosure, the first connecting portion is connected to a side edge of the first printed circuit board.

In some embodiments of the present disclosure, the display panel has a touch layer and a display layer, and the first printed circuit board includes a display circuit and a touch circuit, wherein the display circuit is electrically connected to the display layer, and the touch circuit is electrically connected to the touch layer.

In some embodiments of the present disclosure, an orthographic projection of the first printed circuit board on a light exit surface of the display panel is within a light exit surface of the display panel, and a ratio of an area of the orthographic projection of the first printed circuit board on the light exit surface of the display panel to the light exit surface of the display panel is not less than 0.5.

In some embodiments of the present disclosure, at least one of a light exit surface of the display panel, a surface of the first connecting portion, and a surface of the second connecting portion has a hand-tearable adhesive film.

Embodiments of the present disclosure provide a display device, including a host and the display module described above; wherein the display device further includes a hollow rotation shaft, one end of the hollow rotation shaft is connected to the display module, the other end of the hollow rotation shaft is movably mounted on the host, and the connecting band is disposed within the hollow rotation shaft.

BRIEF DESCRIPTION OF DRAWINGS

In order to describe the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

DETAILED DESCRIPTION

In order to make the objects, technical solutions and advantages of the present disclosure clearer, embodiments of the present disclosure are described in further detail below in conjunction with the accompanying drawings.

Unless separately defined, technical terms or scientific terms herein shall have the ordinary meaning as understood by persons having ordinary skill in the art to which this disclosure relates. The terms "first", "second", "third" and the like in the description of the application and the claims of the disclosure do not indicate any order, number or importance, but are used only to distinguish between the different components. Similarly, the words "one" or "a" and similar words do not indicate a quantitative limitation, but the existence of at least one. Similar words such as "includes" or "contains" are intended to indicate that the element or object appearing before "includes" or "contains" cover the elements or objects appearing after "includes" or "contains" and their equivalents, and do not exclude other elements or objects. Similar words such as "connected" or "linked" are not limited to physical or mechanical connections, but may include electrical connections, whether direct or indirect. The terms "up", "down", "left", "right", etc. are only used to indicate relative position relationships, and when the absolute position of the object being described is changed, the relative positional relationships described may also be changed accordingly.

Figure 1:
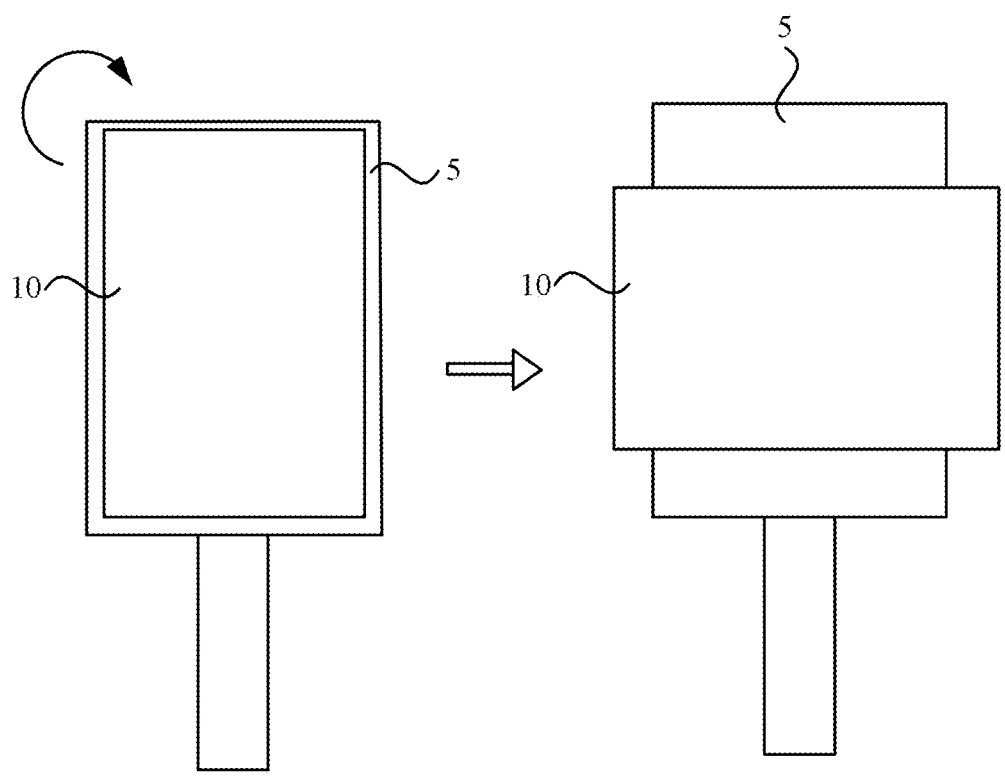
FIG. 1 is a schematic diagram of a rotation state change of a display device according to some embodiments of the present disclosure.
Figure 2:
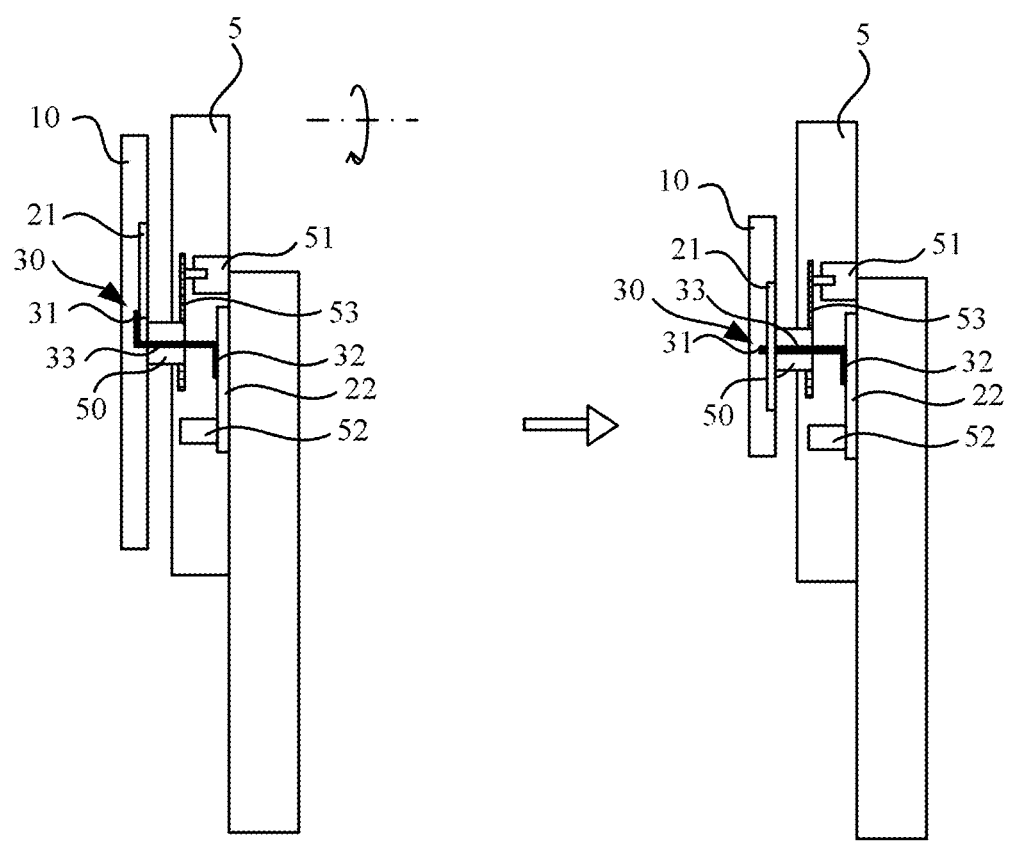
FIG. 2 is a schematic diagram of a rotation state change of a display device according to some embodiments of the present disclosure.

FIG. 1 is a schematic diagram of a rotation state change of a display device according to some embodiments of the present disclosure. FIG. 2 is a schematic diagram of a rotation state change of a display device according to some embodiments of the present disclosure. FIG. 1 illustrates a front view of the display device. FIG. 2 illustrates a side view of the display device. As shown in FIGS. 1, 2, the display device includes a display module 10 and a host 5, with the display module 10 rotatably mounted on the host 5.

In conjunction with FIGS. 1, 2, the left side of the figure illustrates the display device in a state of vertical screen, and the right side of the figure illustrates the display device in a state of horizontal screen. In the case that the display module 10 is rotated relative to the host 5, the switching between the horizontal and vertical screens of the display device is realized.

Figure 3:
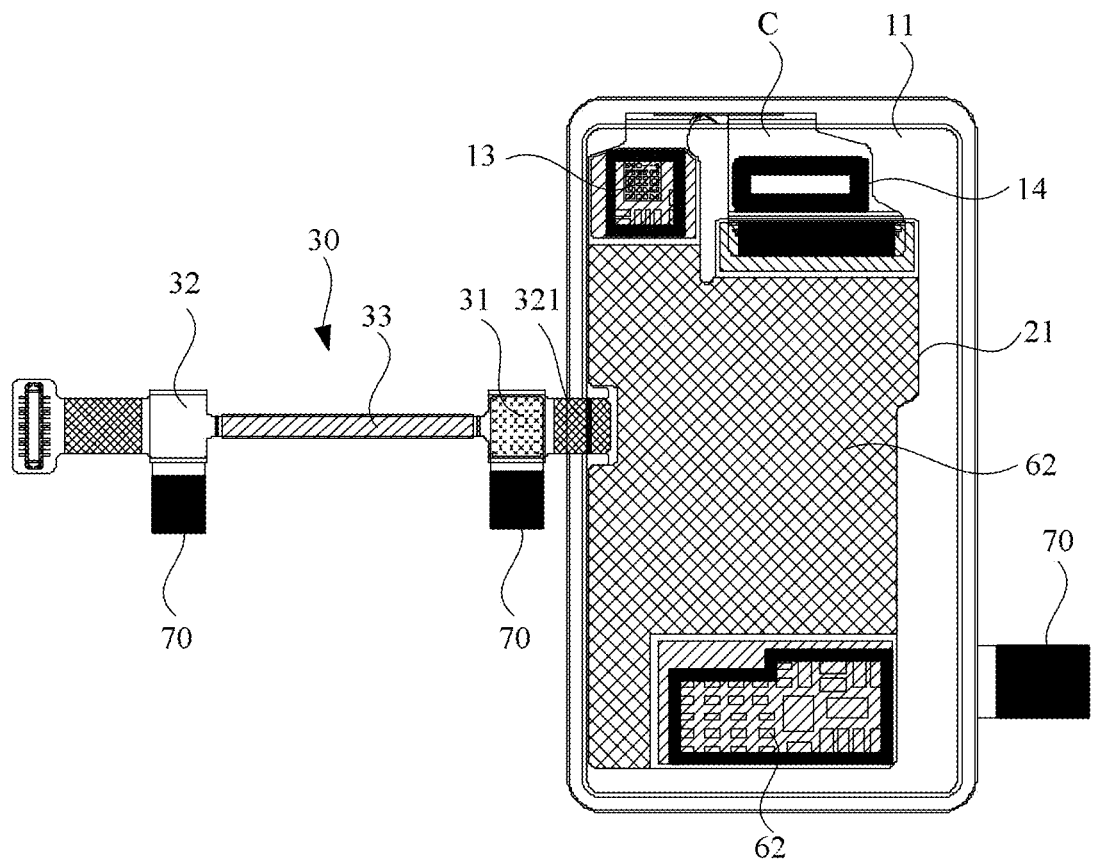
FIG. 3 is a schematic diagram of a structure of a display module according to some embodiments of the present disclosure.

FIG. 3 is a schematic diagram of a structure of a display module according to some embodiments of the present disclosure. As shown in FIG. 3, the display module includes a display panel 11, a first printed circuit board 21, and a flexible printed circuit board 30. The display panel 11 is electrically connected to the first printed circuit board 21, and the first printed circuit board 21 is disposed at the back of the display panel 11.

The back of the display panel is a surface, distal from a light exit surface of the display panel, on the display panel.

As shown in FIGS. 2 and 3, the flexible printed circuit board 30 includes a first connecting portion 31, a second connecting portion 32, and a flexible connecting structure 33, and two ends of the flexible connecting structure 33 are connected to the first connecting portion 31 and the second connecting portion 32 respectively. The first connecting portion 31 is connected to the circuit board of the display module 10, and the second connecting portion 32 is configured to be connected to the host 5.

The second connecting portion 32 is connected to a second printed circuit board 22 within the host 5, and the second printed circuit board 22 is a whole main board within the host 5 for connecting electronic devices such as a power supply. The whole main board is connected to the flexible printed circuit board to supply power to the display module as well as to output control signals to the display module.

Referring to FIG. 2, during the rotation of the display module 10 relative to the host 5, the flexible printed circuit board 30 connecting the first printed circuit board 21 to the second printed circuit board 22 within the host 5 also rotates, and the flexible printed circuit board 30 is susceptible to damage.

Figure 4:
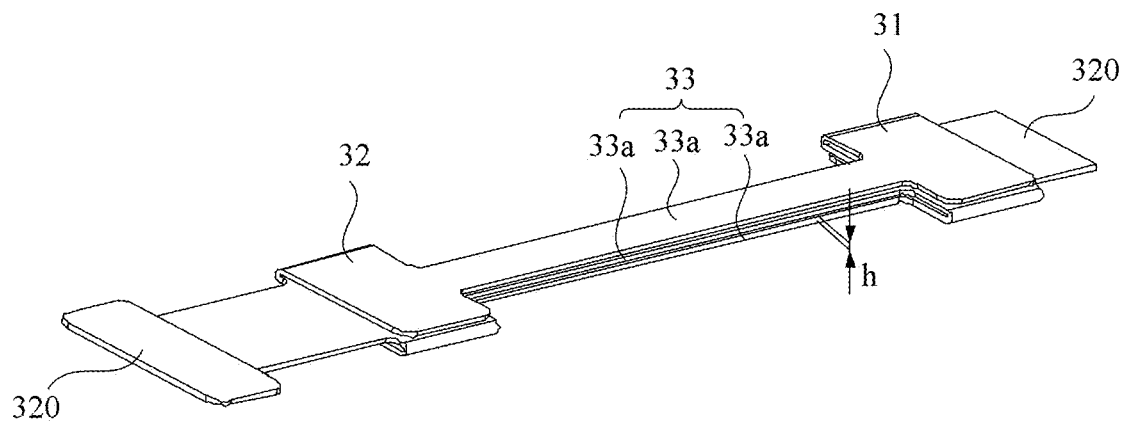
FIG. 4 is a schematic diagram of a structure of a flexible printed circuit board according to some embodiments of the present disclosure.

FIG. 4 is a schematic diagram of a structure of a flexible printed circuit board according to some embodiments of the present disclosure. As shown in FIG. 4, the flexible connecting structure 33 includes a plurality of stacked connecting bands 33a.

The first printed circuit board 21 of the display module and the second printed circuit board 22 of the host 5 provided by the embodiments of the present disclosure are connected by the flexible printed circuit board to realize electrical connection between the display module 10 and the host 5, and the display module 10 can be rotated relative to the host 5. In the case that the horizontal and vertical screens need to be switched, compared to controlling the whole display device to rotate, the display device only needs to control the rotation of the display module 10, which has a simpler and lighter structure, and thus meets the needs of use while reducing the energy consumption of controlling the rotation of the display device.

Simultaneously, the flexible connecting structure 33 includes a plurality of stacked connecting bands 33a, which is equivalent to stacking a plurality of single-layer flexible printed circuit boards 30 together to form a flexible printed circuit board 30 with a higher thickness, thereby enhancing the torsion resistance of the flexible printed circuit board 30, such that the flexible printed circuit board 30 is not easy to be damaged when the display module 10 rotates relative to the host 5 rotate, and enhancing the reliability of the display device.

Figure 5:
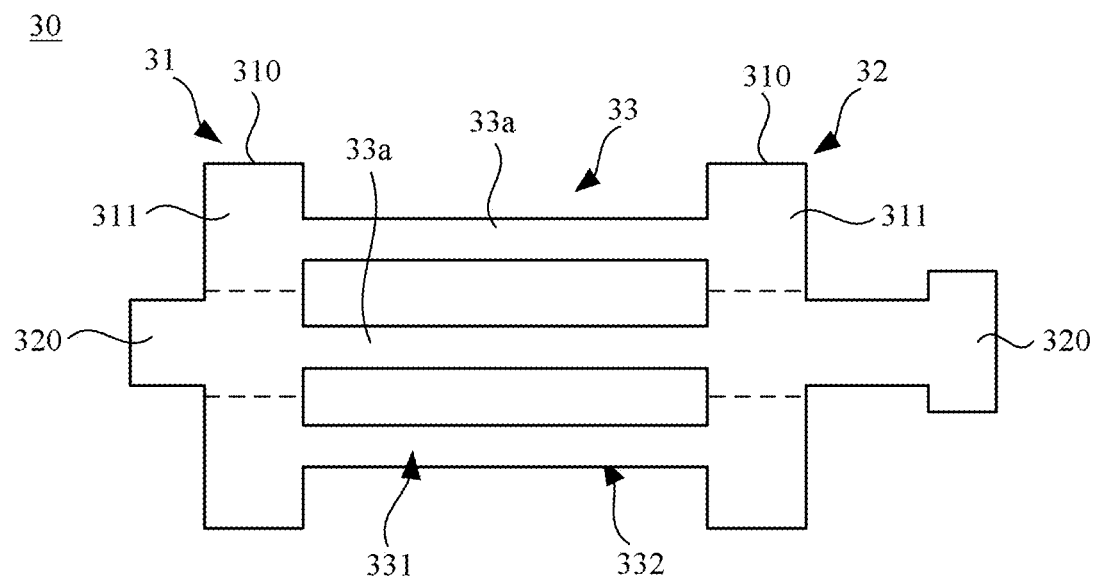
FIG. 5 is a diagram of a flexible printed circuit board in an unfolded state according to some embodiments of the present disclosure.

FIG. 5 is a diagram of a flexible printed circuit board in an unfolded state according to some embodiments of the present disclosure. As shown in FIG. 5, both ends of each connecting band 33a are connected to the first connecting portion 31 and the second connecting portion 32 respectively, and the connecting band 33a has a first side face 331 and a second side face 332.

Figure 6:
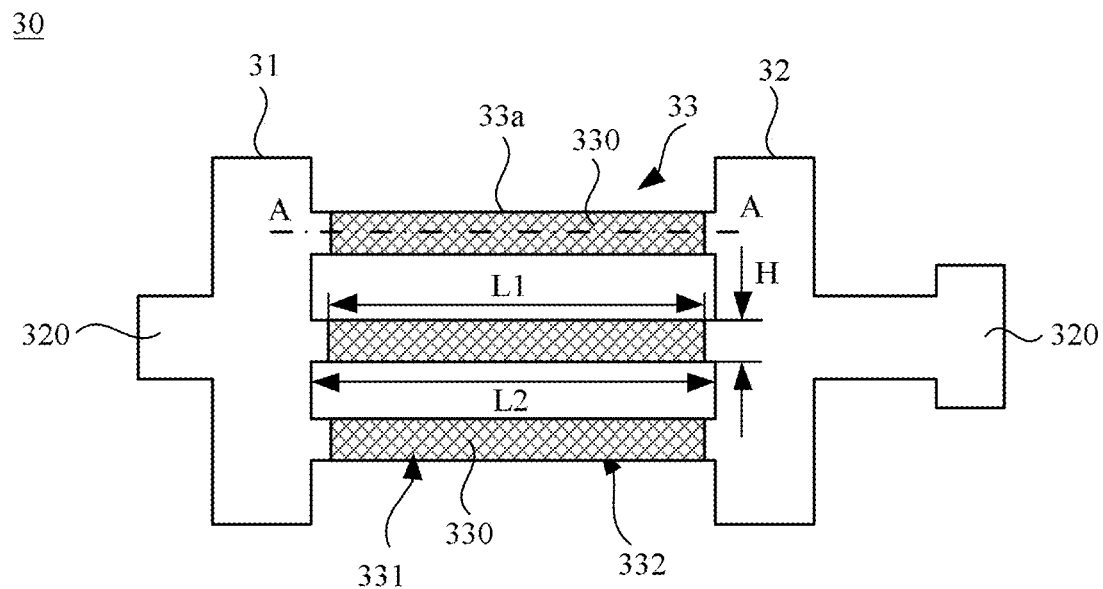
FIG. 6 is a diagram of a flexible printed circuit board in an unfolded state according to some embodiments of the present disclosure.

FIG. 6 is a diagram of a flexible printed circuit board in an unfolded state according to some embodiments of the present disclosure. As shown in FIG. 6, the first side face 331 of at least one connecting band 33a has a thinning groove 330. The first side face 331 of the connecting band 33a is opposite to the second side face 332 of the adjacent connecting band 33a in the stacking direction.

In the embodiments of the present disclosure, the flexible printed circuit board (FPCB) 30 is a flexible printed circuit formed by using a polyimide copper clad plate as a substrate and covering a protective film on the surface of the substrate.

In the case that the thinning groove 330 is provided on the surface of the flexible printed circuit board 30, the protective film on the surface of the flexible printed circuit board 30 is removed. By relatively fitting the side of the connecting band 33a provided with the thinning groove 330 to the side of the other connecting band 33a not provided with the thinning groove 330, after the connecting band 33a is stacked, a short-circuit problem between the connecting bands 33a to short-circuit between the two connecting bands 33a due to the fit of the thinning grooves 330 of the two connecting bands 33a is effectively avoided.

In the above implementations, the thinning grooves 330 are provided on the connecting bands 33a for thinning, which reduces the thickness of one connecting band 33a, thereby reducing the overall thickness of the flexible printed circuit board 30 upon stacking, and facilitating the rotation of the flexible printed circuit board 30.

Figure 7:
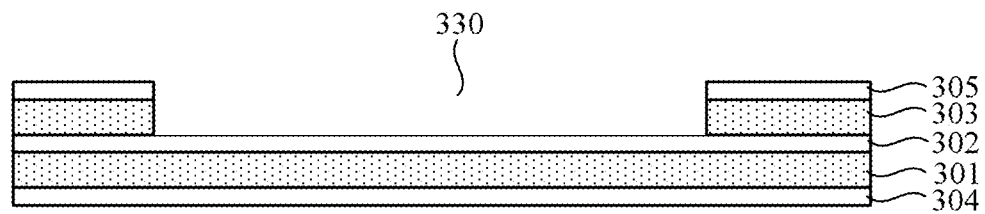
FIG. 7 is a schematic diagram of a cross-section of a flexible printed circuit board according to some embodiments of the present disclosure.

FIG. 7 is a schematic diagram of a cross-section of a flexible printed circuit board according to some embodiments of the present disclosure. FIG. 7 is a cross-sectional view formed with the AA dashed line in FIG. 6 as a section line. As shown in FIG. 7, the flexible printed circuit board 30 includes a first cover film 304, a first conductive layer 301, an insulative layer 302, a second conductive layer 303, and a second cover film 305 stacked sequentially in the thickness direction. The flexible printed circuit board with the double conductive layers can meet the request for the alignment of the display module.

Exemplarily, the first cover film, the second cover film, and the insulative layer are PI films, and the first conductive layer and the second conductive layer are metal layers, e.g., the metal layer is a copper layer.

In the above implementation, as shown in FIG. 7, providing a thinning groove 330 in the connecting band 33a of the flexible printed circuit board 30 indicates scooping out the conductive layer and the covering film on one side of the insulative layer 302, thereby thinning the flexible printed circuit board with a double conductive layer into a flexible printed circuit board with a single conductive layer, and decreasing the thickness of the connecting band 33a to facilitate bending and twisting.

In some other implementations, the flexible printed circuit board 30 is a flexible printed circuit board with a single conductive layer, which is capable of realizing the electrical connection between the first printed circuit board 21 and the second printed circuit board 22.

Figure 8:
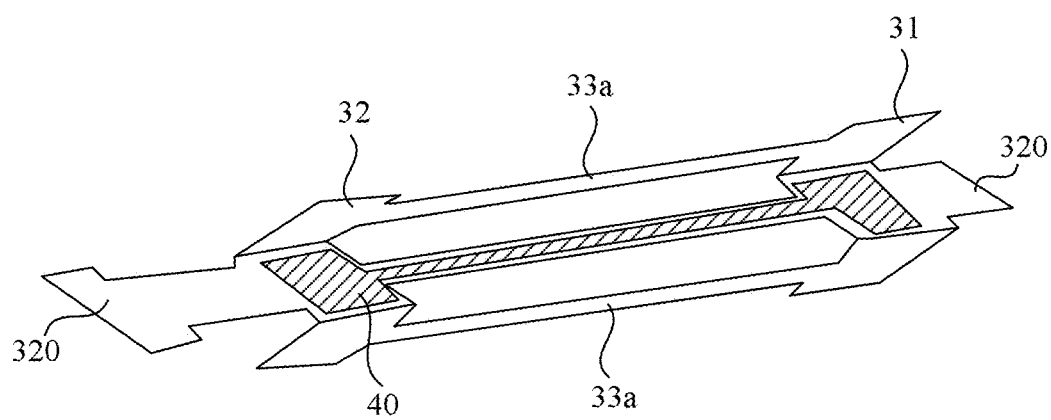
FIG. 8 is a schematic diagram of a stacking process of a twisted band according to some embodiments of the present disclosure.

FIG. 8 is a schematic diagram of a stacking process of a twisted band according to some embodiments of the present disclosure. As shown in FIG. 8, first side face 331 and second side face 332 of any two adjacent connecting bands 33a in the stacking direction are bonded to each other by a double-side adhesive layer 40.

By providing the double-side adhesive layer 40 between any two connecting bands 33a in the stacking direction, the two adjacent connecting bands 33a are adhered more closely, thereby enhancing the reliability of the flexible printed circuit board 30.

Exemplarily, the thickness of the double-side adhesive layer 40 is not less than the depth of the thinning groove 330. This allows the double-side adhesive layer 40 to completely fill the gap between the thinning groove 330 and the second side face 332, such that the first side face 331 and the second side face 332 of the different connecting bands 33a can be completely adhered.

Optionally, as shown in FIG. 5, the ratio of the length L1 of the thinning groove 330 to the length L2 of the connecting band 33a ranges from 0.6 to 0.9.

The length direction indicates the alignment direction of the first connecting portion 31 and the second connecting portion 32 in the case that the flexible printed circuit board 30 is in the unfolded state.

By setting the ratio of the length of the thinning groove 330 to the length of the connecting band 33a to be within the above range, the problem of the length of the thinning groove 330 being too long, which results in the thickness of the connecting region between the connecting band 33a and the connecting portion being too small, can be avoided, so as to enhance the reliability of the connection between the connecting band 33a and the connecting portion. It can also be avoided that the length of the thinning groove 330 is too small, which fails to achieve the purpose of scaling down the overall thickness of the flexible printed circuit board 30.

Exemplarily, the ratio of the length of the thinning groove 330 to the length of the connecting band 33a is 0.8.

For example, the length of the connecting band 33a is 2 cm, the length of the thinning groove 330 is 1.6 cm, the thinning groove 330 is disposed in the middle of the connecting band 33a, and the distances between both ends of the thinning groove 330 and the closest end of the connecting band 33a are 0.2 cm.

Optionally, the width H of the thinning groove 330 is the same as the width of the connecting band 33a, as shown in FIG. 6.

The width direction indicates the alignment direction perpendicular to the first connecting portion 31 and the second connecting portion 32 in the case that the flexible printed circuit board 30 is in the unfolded state.

By arranging the width of the thinning groove 330 to be the same as the width of the connecting band 33a, in the case that the first side face 331 and the second side face 332 of the stacked connecting band 33a are fixed, it is possible to make the region of the second side face 332 opposite to the thinning groove 330 extend into the thinning groove 330, such that the second side face 332 is fixed to the bottom of the thinning groove 330, and the thickness of the flexible printed circuit board 30 upon stacking the connecting band 33a is reduced as much as possible to facilitate twisting of the connecting band 33a.

Optionally, the ratio of the depth of the thinning groove 330 to the thickness h of the connecting band 33a ranges from 0.3 to 0.7.

The depth of the thinning groove 330 and the thickness h of the connecting band 33a are lengths in a direction perpendicular to the first side face 331.

By setting the ratio of the depth of the thinning groove 330 to the thickness of the connecting band 33a to be within the above range, it can avoid the problem that the depth of the thinning groove 330 is too large, which results in the thickness of the remaining portion of the connecting band 33a upon grooving to be too small, and affects the strength of the connecting band 33a. It can also avoid that the depth of the thinning groove 330 is too small, which fails to achieve the purpose of scaling down the overall thickness of the flexible printed circuit board 30.

Exemplarily, the ratio of the slot depth of the thinning groove 330 to the thickness of the connecting band 33a is 0.5.

For example, the thickness of the connecting band 33a is 0.1 mm, and the depth of the thinning groove 330 is 0.05 mm. The depth of the thinning groove 330 is half of the thickness of the connecting band 33a, such that two connecting bands 33a are equivalent to the thickness of one connecting band 33a upon stacking, which can effectively scale down the overall thickness of the flexible printed circuit board 30, and facilitate the twist of the stacked multilayer connecting bands 33a.

Figure 9:
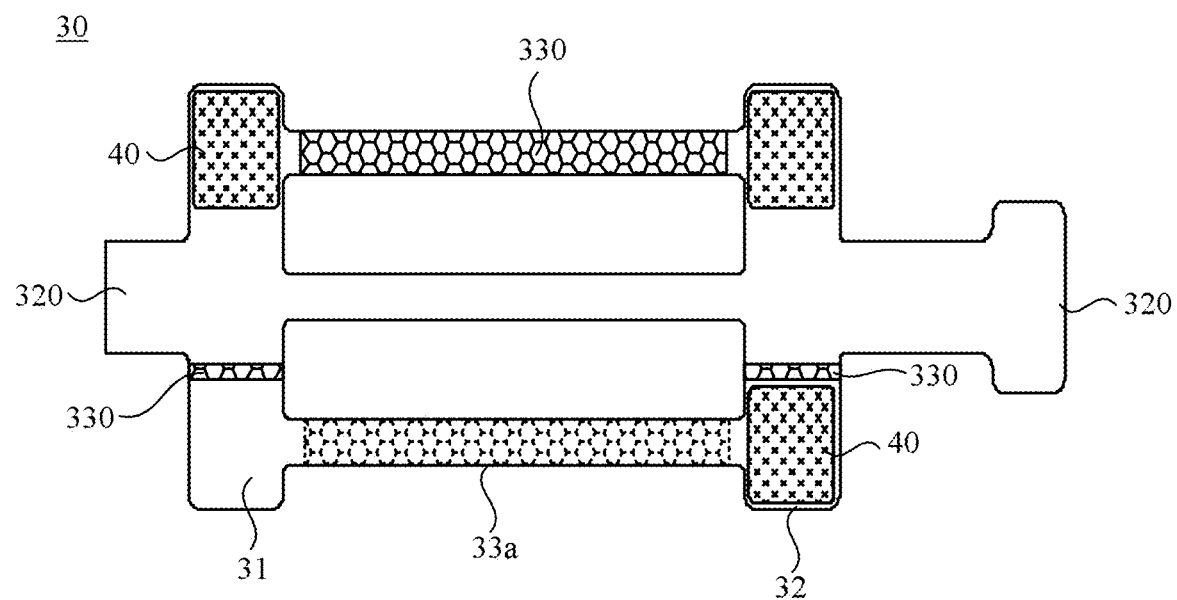
FIG. 9 is a schematic diagram of a flexible printed circuit board in an unfolded state according to some embodiments of the present disclosure.

FIG. 9 is a schematic diagram of a flexible printed circuit board in an unfolded state according to some embodiments of the present disclosure. FIG. 9 is an unfolded view of a flexible printed circuit board formed using the stacking approach illustrated in FIG. 8. As shown in FIG. 9, the connecting band 33a disposed in the middle of the flexible printed circuit board 30 is not provided with a thinning groove 330, the two connecting bands 33a disposed on the upper and lower sides of the flexible printed circuit board 30 are provided with the thinning grooves 330, and the thinning grooves 330 of the two connecting bands 33a disposed on the upper and lower sides of the flexible printed circuit board 30 are disposed on the opposite sides of the flexible printed circuit board 30 respectively (see solid line filled and dashed lines filled in FIG. 9).

This ensures that the sides of the two stacked connecting bands 33a provided with the thinning grooves 330 are not directly opposite each other when folded through the laminated manner illustrated in FIG. 8, such that short-circuiting of the stacked connecting bands 33a is prevented.

Exemplarily, as shown in FIG. 9, the thinning grooves 330 is provided in the regions of the first connecting portion 31 and the second connecting portion 32 that need to be folded, which reduces the strength of the regions of the connecting portions that need to be folded, thereby facilitating quick bending.

Exemplarily, as shown in FIG. 9, the double-side adhesive layer 40 is provided only in the folding region of the first connecting portion and the second connecting portion, and the double-side adhesive layer 40 is not disposed on the surface of the connecting band 33a to save costs.

Optionally, as shown in FIG. 4, in the case that the flexible printed circuit board 30 is in the unfolded state, the connecting bands 33a are spaced apart in parallel, and the shape and area of the connecting bands 33a are the same.

By setting the shape and area of the connecting bands 33a to be the same, the connecting bands 33a is completely overlapped with each together upon stacking.

Optionally, as shown in FIG. 4, the flexible connecting structure 33 is linear, and the flexible connecting structure 33 runs through a line connecting the geometric center of the first connecting portion 31 to the geometric center of the second connecting portion 32.

The flexible connecting structure being linear indicates that the flexible connecting structure extends along a straight line. For example, the orthographic projection of the flexible connecting structure is a rectangle, and the flexible connecting structure extends along a straight line parallel to the long side of the rectangle.

In the above implementations, in the case that the connecting bands 33a are stacked to form the flexible connecting structure 33, the line connecting the geometric centers of the two connecting portions is co-linear to the geometric center of the flexible connecting structure 33, such that the two connecting portions and the flexible connecting structure form the linear-type flexible printed circuit board 30.

This linear-type flexible printed circuit board 30 is suitable for the case where the connecting portions are connected to the circuit board in a position exactly opposite to the hollow rotation shaft 50. In this way, the first connecting portion 31 connected to the circuit board of the display module 10 is directly disposed into the hollow rotation shaft 50, and the second connecting portion 32 runs through the hollow rotation shaft 50 to be connected to the circuit board in the host 5.

FIG. 4 illustrates an example of a flexible printed circuit board 30 provided with three connecting bands 33a. The connecting bands 33a of the flexible printed circuit board 30 are folded and stacked together with the axis of symmetry between two adjacent connecting bands 33a as the centerline, such that the two connecting portions and the connecting bands 33a form the liner flexible printed circuit board 30.

Figure 10:
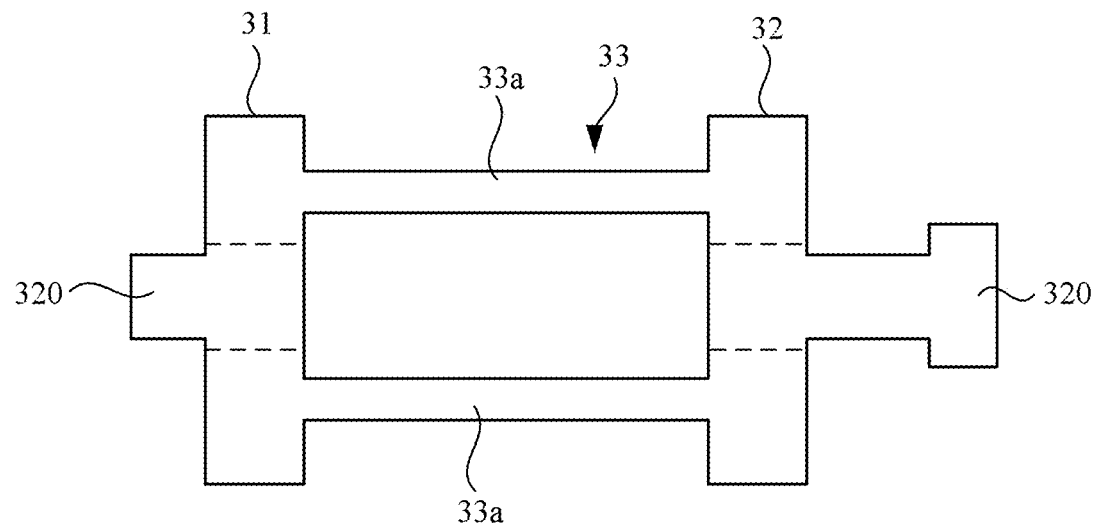
FIG. 10 is a diagram of a flexible printed circuit board in an unfolded state according to some embodiments of the present disclosure.

FIG. 10 is a diagram of a flexible printed circuit board in an unfolded state according to some embodiments of the present disclosure. As shown in FIG. 10, the flexible connecting structure 33 includes two connecting bands 33a. In the case that the connecting bands 33a of the flexible connecting structure 33 are stacked, the two connecting bands 33a are folded to a line connecting the geometric center of the first connecting portion 31 to the geometric center of the second connecting portion 32, such that the two connecting portions and the flexible connecting structure 33 form the linear flexible printed circuit board 30.

In some other implementations, the two connecting bands 33a are folded and stacked together with the axis of symmetry between the two connecting bands 33a as the centerline. In this way, the first connecting portion 31 and the second connecting portion 32 are also folded, which further reduces the width of the flexible printed circuit board 30 and facilitate the twisting of the flexible printed circuit board 30.

Figure 11:
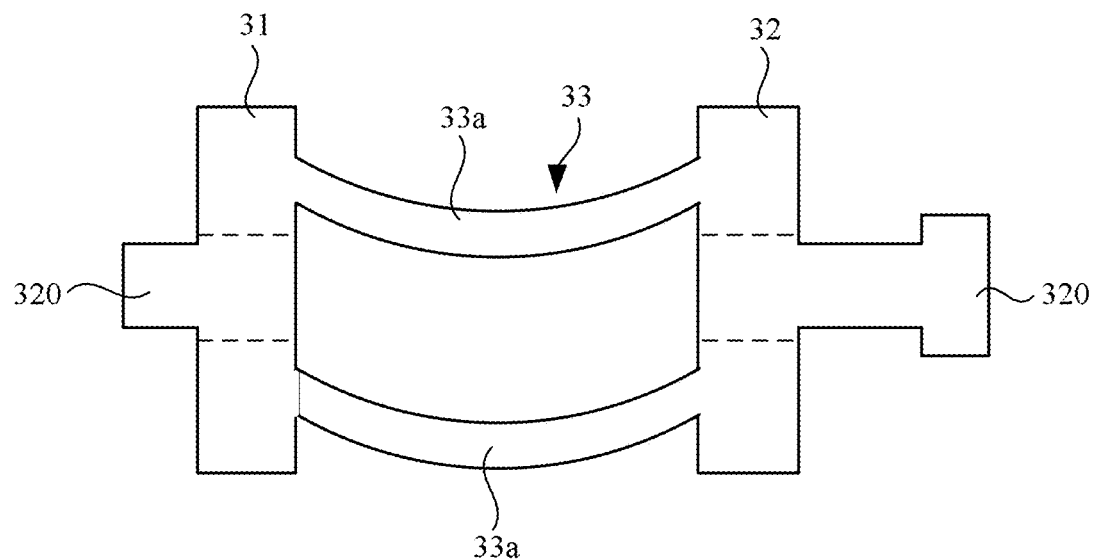
FIG. 11 is a diagram of a flexible printed circuit board in an unfolded state according to some embodiments of the present disclosure.

FIG. 11 is a diagram of a flexible printed circuit board in an unfolded state according to some embodiments of the present disclosure. As shown in FIG. 11, the flexible connecting structure 33 is in a fan ring shape, and the middle region of the flexible connecting structure 33 is outside the line connecting the geometric center of the first connecting portion 31 to the geometric center of the second connecting portion 32.

In the above implementation, the fan ring flexible connecting structure 33 is bended, and the flexible connecting structure 33 is formed by the stacked connecting bands 33a, such that the connecting bands 33a are also bended. In this way, in the case that the connecting bands 33a are stacked, the middle region of the flexible connecting structure 33 is not in the line of the geometric centers of the first connecting portion 31 and the second connecting portion 32. Because the display module 10 is rotationally connected to the host 5 by the hollow shaft 50, the flexible printed circuit board 30 is connected to the host 5 and the display module 10 via the hollow shaft 50. In the case that the first connecting portion 31 is not facing the end of the hollow shaft 50, the flexible connecting structure 33 is extended to the end of the hollow shaft 50 upon being bent once. In the case that the flexible connecting structure 33 is set into a bent structure, because a certain bending is present between the flexible connecting structure 33 and the first connecting end, the flexible connecting structure 33 of this kind flexible printed circuit board 30 can directly enter into the hollow rotation shaft 50 without bending, which can reduce the quantity of bending times of the flexible connecting structure 33 to enhance the reliability of the flexible connecting structure 33.

Exemplarily, as shown in FIG. 11, the flexible connecting structure 33 includes two fan ring connecting bands 33a, both connecting bands 33a being bent in the same direction.

Upon stacking, the ends of the connecting bands 33a are folded to a line connecting the geometric center of the first connecting portion 31 to the geometric center of the second connecting portion 32, while the middle portion of the flexible connecting structure 33 is outside of the line connecting the geometric center of the first connecting portion 31 to the geometric center of the second connecting portion 32. In this way, a certain bending is present between the connecting portion and the flexible connecting structure 33, and the flexible connecting structure 33 of this type flexible printed circuit board 30 can enter directly into the hollow rotation shaft 50 without bending, which enhances the reliability of the flexible connecting structure 33.

It should be noted that in the case that the flexible connecting structure 33 includes a plurality of fan ring connecting bands 33a, the connecting bands 33a are bent in the same direction to ensure that the connecting bands 33a are completely overlapped with each other upon stacking.

Figure 12:
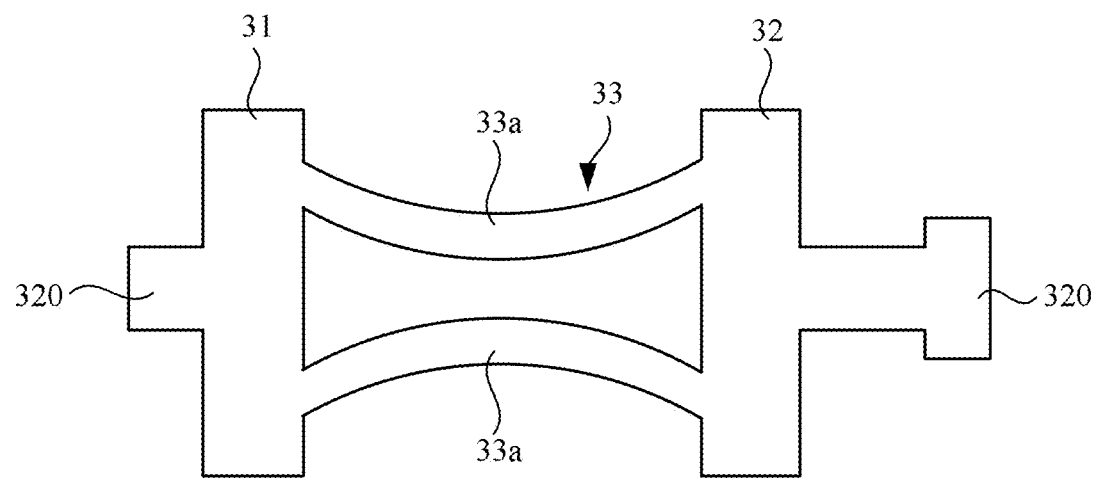
FIG. 12 is a diagram of a flexible printed circuit board in an unfolded state according to some embodiments of the present disclosure.

Exemplarily, as shown in FIG. 12, the flexible connecting structure 33 includes two fan ring connecting bands 33a, and the two fan ring connecting bands 33a are symmetrically distributed. When being stacked, the two connecting bands 33a are folded and stacked together with the axis of symmetry between the two connecting bands 33a as the centerline. In this way, the first connecting portion 31 and the second connecting portion 32 are also folded, which can further reduce the width of the flexible printed circuit board 30 and facilitate the twisting of the flexible printed circuit board 30.

The difference between the flexible printed circuit board illustrated in FIG. 11 and the flexible printed circuit board illustrated in FIGS. 4 to 9 is that the shape of the flexible connecting structure is different. The dimensions of the flexible connecting structure, the positional relationship with other structures on the flexible printed circuit board and the connecting relationship can be referred to the examples in FIGS. 4 to 9, and the embodiments of the present disclosure is not repeated herein.

Optionally, as shown in FIGS. 4 and 5, the first connecting portion 31 and the second connecting portion 32 are folded from the connection side plate 310. In the case that the flexible printed circuit board 30 is in an unfolded state, the length direction of the connection side plate 310 is perpendicular to the arranging direction of the first connecting portion 31 and the second connecting portion 32.

As shown in FIG. 4, the connecting side plate 310 has a plurality of folding regions 311 sequentially connected along the length direction. The plurality of folding regions 311 are in one-to-one correspondence to the plurality of connecting bands 33a, and each of the folding regions 311 is connected to the corresponding connecting band 33a.

As shown in FIG. 5, the plurality of folding regions 311 are stacked when the flexible printed circuit board 30 is in a folded state.

In the embodiments of the present disclosure, in the case that the flexible printed circuit board 30 is in the unfolded state, the length direction of the first connecting portion 31 and the second connecting portion 32 is the same as the row direction of the connection bands 33a, such that a sufficiently large regions are provided on the first connecting portion 31 and the second connecting portion 32 for connection with the connection bands 33a, and the purpose that the plurality of connection bands 33a are connected to the connecting portion simultaneously is achieved.

Folding the connecting side panel 310 can not only reduce the length of the connecting side panel 310, but also stack the folding regions 311 of the connecting side panel 310 together to form a thicker connecting side panel 310, such that the twisting resistance of the connecting side panel 310 is enhanced and the reliability of the display device is improved.

Optionally, as shown in FIG. 8, any two adjacent folding regions 311 are bonded to each other by the double-side adhesive layer 40. By providing the double-side adhesive layer 40 between any two adjacent folding regions 311, the folding regions 311 can be adhered more closely, thereby enhancing the reliability of the connecting side panel 310.

Optionally, the ratio of the width of the connecting band 33a to the width of the folding regions 311 ranges from 0.3 to 0.7.

The width direction indicates the alignment direction perpendicular to the end of the first connecting portion 31 and the second connecting portion 32 in the case that the flexible printed circuit board 30 is in the unfolded state.

By setting the ratio of the width of the connecting band 33a to the width of the folding region 311 within the above range, it can avoid the width of the connecting band 33a being too large, which results in the hardness and stiffness of the connecting band 33a being too large to be easily bent and twisted, and it can also avoid the width of the connecting band 33a being too small, which results in the hardness and stiffness of the connecting band 33a being poorer, and reduces the twisting resistance performance of the connecting band 33a.

Exemplarily, the ratio of the width of the connecting band 33a to the width of the folding region 311 is 0.5.

For example, the width of the folding region 311 is 50 mm, and the width of the connecting band 33a is 25 mm. The width of the connecting band 33a is half of the width of the folding region 311. In this way, in the case that the two connecting bands 33a are stacked, the width of the connecting band 33a is substantially reduced relative to the connecting side plate 310, which can to a certain extent reduce the hardness and stiffness of the connecting band 33a and make the connecting band 33a easier to be bent and twisted.

Figure 13:
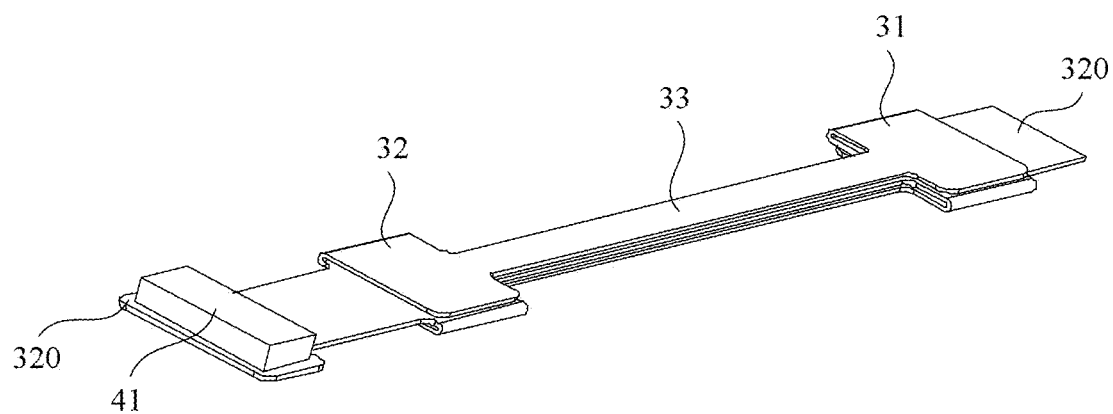
FIG. 13 is a schematic diagram of a structure of a flexible printed circuit board according to some embodiments of the present disclosure.

FIG. 13 is a schematic diagram of a structure of a flexible printed circuit board according to some embodiments of the present disclosure. As shown in FIG. 13, the first connecting portion 31 and the second connecting portion 32 further include a connecting structure 320, and the connecting structure 320 and the connecting band 33a are disposed on opposite sides of the connecting side plate 310 respectively.

The display module further includes a connector 41, the connector 41 being disposed on the connecting structure 320 of the second connecting portion 32, and the connector 41 being configured to be connected to the second printed circuit board 22 within the host 5.

In the embodiments of the present disclosure, the connector 41 is a conductive structure such as a metal block, and the region of the connecting structure 320 where the metal block is connected is provided with a recess that exposes the polyimide copper clad plate, and the metal block is disposed in the recess and connected to the polyimide copper clad plate. In this way, the metal block is connected to the second printed circuit board 22, the purpose of connecting the flexible printed circuit board 30 to the second printed circuit board 22 is achieved.

In some implementations of the present disclosure, a shape of the connecting structure 320 is linear. This shape of the connecting structure 320 is suitable for the case where the connection surface of the second printed circuit board 22 faces the hollow rotation shaft 50.

The connecting surface of the second printed circuit board 22 is a side of the circuit board that is provided with pins or interfaces for connecting to electronic devices.

In the case that the connecting surface of the second printed circuit board 22 faces the hollow rotation shaft 50, after the connecting band 33a extends out of the hollow rotation shaft 50, an end of the connecting structure 320 is connected to a pin or interface on the connecting surface of the second printed circuit board 22.

In other implementations of the present disclosure, the connecting structure 320 is U-shaped. This U-shaped connecting structure 320 is suitable for cases where the connection surface of the second printed circuit board 22 is disposed distal from the hollow rotation shaft 50.

Figure 14:
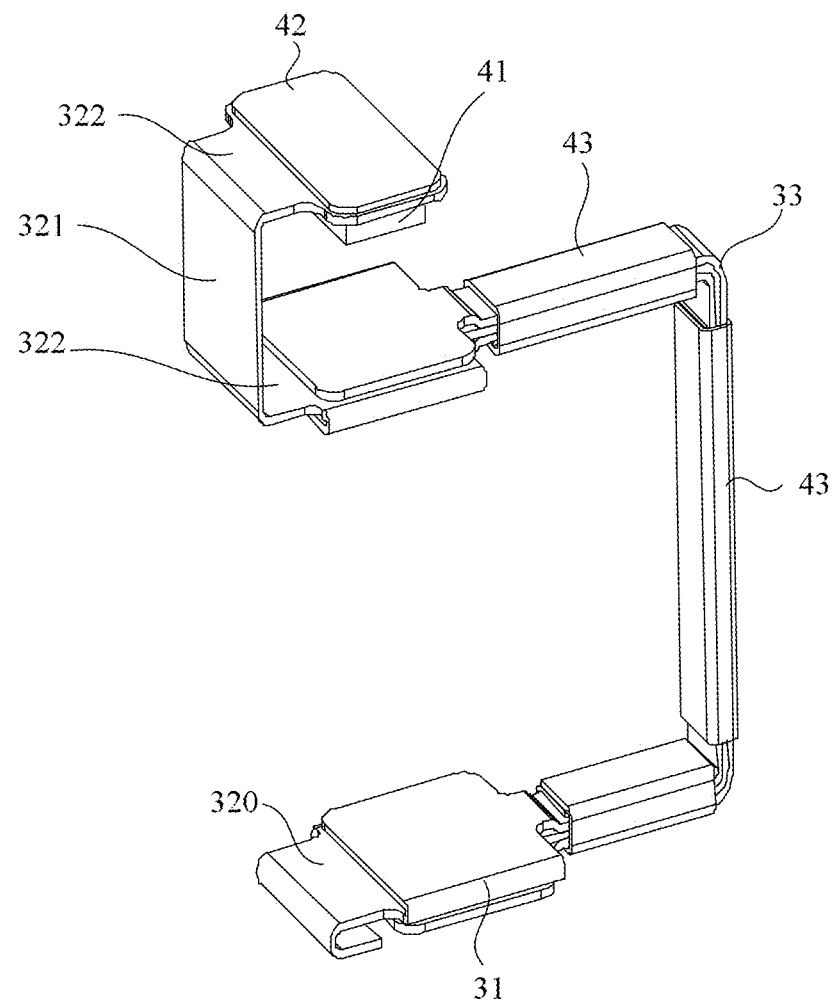
FIG. 14 is a schematic diagram of a structure of a flexible printed circuit board according to some embodiments of the present disclosure.

Exemplarily, FIG. 14 is a schematic diagram of a structure of a flexible printed circuit board according to some embodiments of the present disclosure. As shown in FIG. 14, the connecting structure 320 includes a connecting plate 321 and two clamping plates 322 spaced apart in parallel. The connecting plate 321 is disposed between the two clamping plates 322, the two side edges of the connecting plate 321 are coupled to the two clamping plates 322, and a connector 41 is disposed between the two clamping plates 322 and is coupled to one clamping plate 322.

Figure 15:
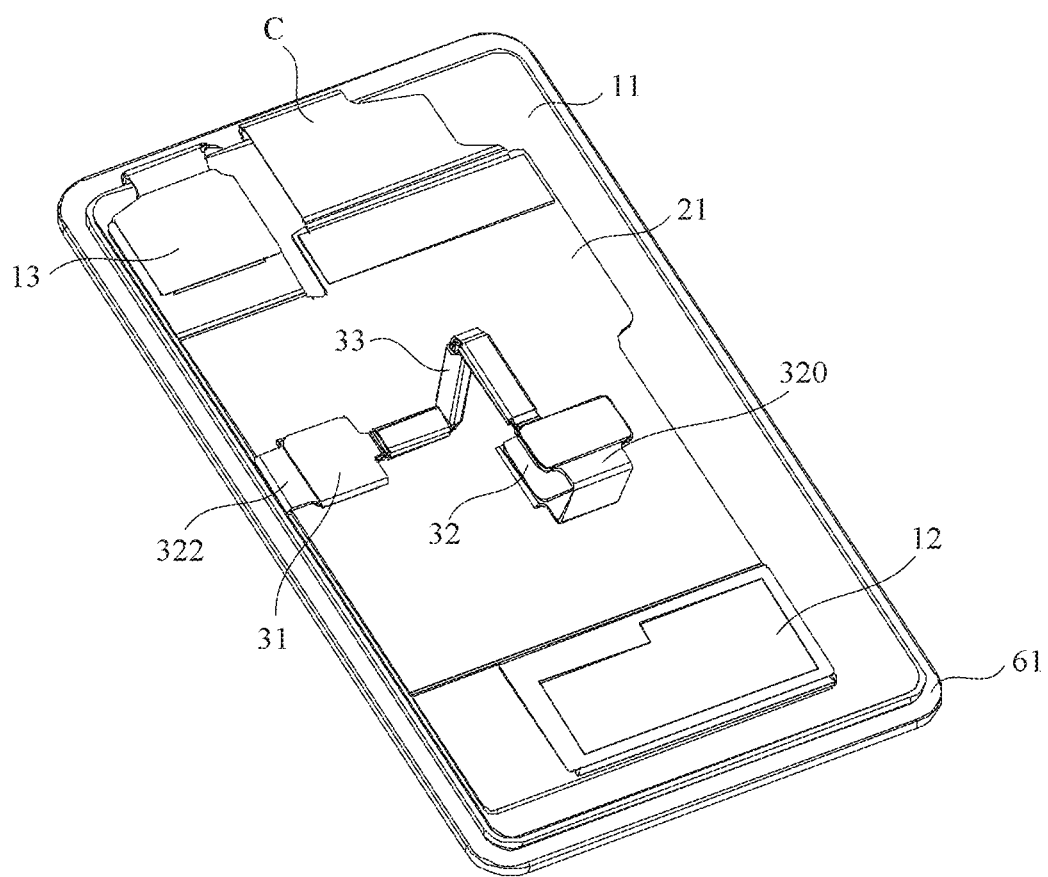
FIG. 15 is a schematic diagram of a connection between a display module and a flexible printed circuit board according to some embodiments of the present disclosure.
Figure 16:
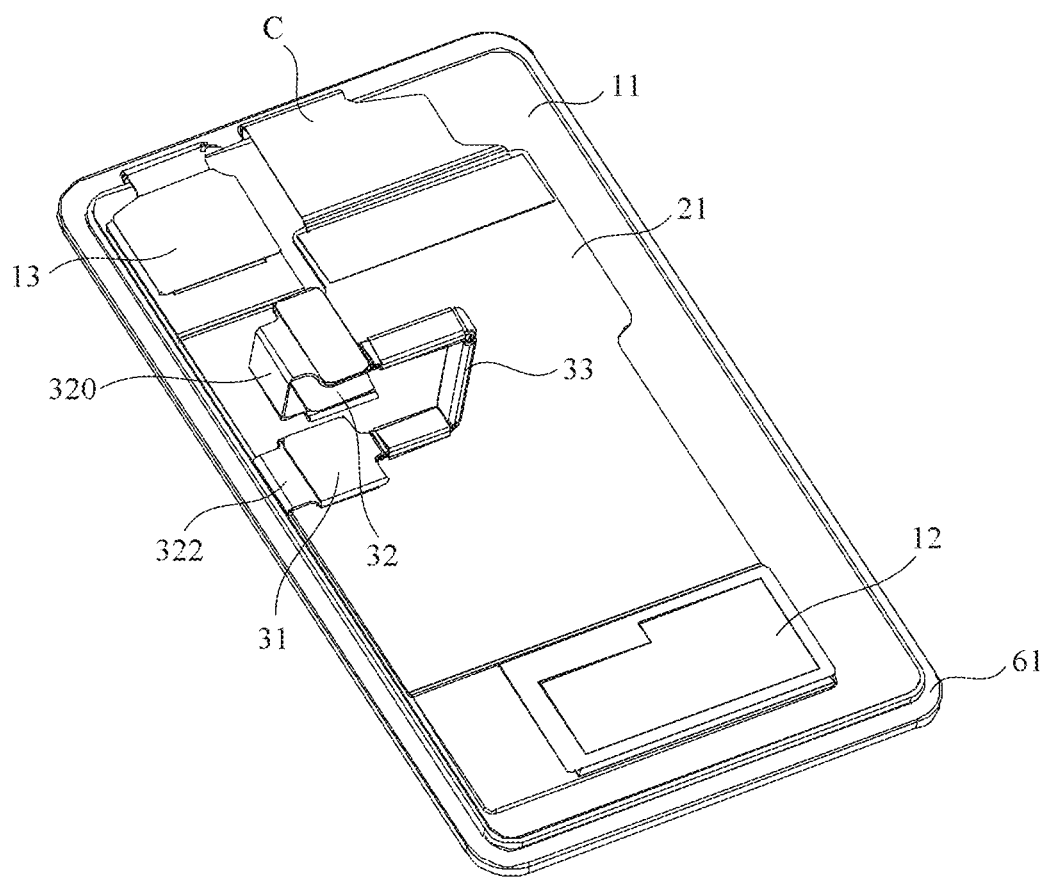
FIG. 16 is a schematic diagram of another connection between display module and a flexible printed circuit board according to some embodiments of the present disclosure.

FIG. 15 is a schematic diagram of a connection between a display module and a flexible printed circuit board according to some embodiments of the present disclosure. FIG. 16 is a schematic diagram of another connection between display module and a flexible printed circuit board according to some embodiments of the present disclosure. One of FIGS. 15 and 16 is a schematic diagram of the display device in a vertical screen state. The other of FIGS. 15 and 16 is a schematic diagram of the display device in a horizontal screen state. As shown in FIGS. 15 and 16, during the process of rotating from the state in FIG. 15 to the state in FIG. 16, the flexible connecting structure 33 is twisted, such that the position of the first connecting portion 31 relative to and the second connecting portion 32 is changed and the switching of the display device between the vertical screen and the horizontal screen is completed.

The second printed circuit board 22 is disposed between the two clamping plates 322. That is, the connecting plate 321, the two clamping plates 322 and the second printed circuit board 22 are pressed against each other.

The connecting structure 320 is enclosed in a U-shaped by the connecting plate 321 and the two clamping plates 322, such that the second printed circuit board 22 is clamped in the U-shaped groove of the connecting structure 320, the connecting plate 321 and the two clamping plates 322 are pressed against the second printed circuit board 22, the connecting structure 320 is mounted more reliably on the second printed circuit board 22, and the reliability of the connection between the connecting structure 320 and the second printed circuit board 22 is improved. The reliability of the connection between the connecting structure 320 and the second printed circuit board 22 is improved.

Moreover, because the connecting surface of the second printed circuit board 22 is distal from the hollow rotation shaft 50, the connecting plate 321 is set in a U-shape to facilitate wrapping the end of the connecting structure 320 provided with the connector 41 to the connecting surface of the second printed circuit board 22, so as to facilitate the electrical connection of the connecting structure 320 to the second printed circuit board 22.

Optionally, at least a portion of a region of the first conductive layer 301 or the second conductive layer 303 of the connecting structure 320 is in a mesh shape.

By setting one electrically conductive layer of the flexible printed circuit board in the mesh shape, the strength and stiffness of the flexible printed circuit board can be weakened to facilitate bending.

Exemplarily, as shown in FIG. 3, the first conductive layer 301 or the second conductive layer 303 of the connecting plate 321 of the connecting structure 320 is in the mesh shape. Because the position of the connecting plate 321 needs to be bent to make the connecting plate 321 and the two clamping plates 322 enclosing a U-shaped connecting structure 320, the first conductive layer 301 or the second conductive layer 303 at the position of the connecting plate 321 is set in a mesh shape to facilitate the bending of the connecting plate 321.

For the flexible printed circuit board with the double layer of conductive layers, in the case that the first conductive layer 301 or the second conductive layer 303 is set as a mesh shape, there is an effect on the conductivity one of the conductive layers. In order not to affect the normal conductivity of the two conductive layers, an aperture is set in the flexible printed circuit board at a position adjacent to the connecting plate 321. The first conductive layer 301 is connected to the second conductive layer 303 through the aperture, such that upon crossing the connecting plate 321, the two conductive layers of the flexible printed circuit board can still conduct electricity to meet the use requirements.

Optionally, as shown in FIG. 14, the connecting structure 320 further includes an enhancing plate 42. The enhancing plate 42 and the connector 41 are disposed on opposite surfaces of one clamping plate 322.

The enhancing plate 42 is a metal plate. For example, the enhancing plate 42 is an aluminum alloy plate.

Because the metal plate has good strength and stiffness, arranging the metal plate on the clamping plate 322 can enhance the stiffness and strength of the clamping plate 322.

In the embodiments of the present disclosure, the orthographic projection of the connector 41 on the clamping plate 322 is at least partially overlapped with the orthographic projection of the enhancing plate 42 on the clamping plate 322. That is, the connector 41 and the enhancing plate 42 are opposite each other to enhance the region on the clamping plate 322 where the connector 41 is mounted and to enhance the reliability of the connecting structure 320.

Optionally, the flexible printed circuit board 30 further includes a protective layer 43. The protective layer 43 is wrapped around the plurality of connecting bands 33a.

The protective layer 43 includes a plurality of protective layers. The plurality of protective layers 43 are spaced along the length direction of the connecting band 33a. And the region where the connecting band 33a bends is not wrapped with the protective layer 43, avoiding increasing the thickness of the connecting band 33a by wrapping the protective layer 43 and making it difficult to bend the connecting band 33a.

Exemplarily, as shown in FIG. 14, the protective layer 43 is adhesive tape. Bundling the plurality of connecting bands 33a together by wrapping the tape ensures that the connecting bands 33a are more stably stacked together.

Exemplarily, the adhesive tape is acetate fabric tape.

Exemplarily, as shown in FIG. 14, the protective layer 43 includes a plurality of segments of tape. The plurality of segments of tape are spaced along the length of the plurality of connecting bands 33a on the connecting bands 33a.

In the embodiments of the present disclosure, the connecting band 33a is provided with three segments of tape. In the region between each tape, the connecting band 33a is bent. Therefore, the regions where the connecting band 33a is bent are not covered with tape to avoid increasing the thickness of the connecting band 33a, which interferes the bending of the connecting band 33a.

Optionally, as shown in FIG. 3, the first printed circuit board 21 and the flexible printed circuit board 30 are integrally formed.

In the embodiments of the present disclosure, the first printed circuit board 21 and the flexible printed circuit board 30 are integrally formed. The first printed circuit board 21 and the flexible printed circuit board 30 are made of the same material and by the same process. For example, the first printed circuit board 21 and the flexible printed circuit board 30 are FPC.

Optionally, as shown in FIG. 3, the first connecting portion 31 is connected to a side edge of the first printed circuit board 21.

Exemplarily, the clamping plate 322 of the first connecting portion 31 is connected to the side edge of the first printed circuit board 21 as shown in FIG. 3. In this way, the flexible printed circuit board and the first printed circuit board are directly integrally formed, such that the flexible printed circuit board is directly connected to the first printed circuit board, which can avoid using a connector for the flexible printed circuit board and save costs.

Optionally, the display panel has a display layer and a touch control layer, the first printed circuit board includes a display circuit and a touch control circuit, the display circuit is electrically connected to the display layer, and the touch control circuit is electrically connected to the touch control layer.

Exemplarily, the display panel is a touch control display panel. The touch control display panel includes a stacked touch control layer and a display layer. The touch control layer is electrically connected to the touch control circuit, and the touch control layer is energized to enable the touch control function of the touch control layer. The display layer is electrically connected to the display circuit, and the display layer is energized to enable the display layer to display the screen.

In the embodiments of the present disclosure, the touch control circuit board controlling the touch control layer and the display circuit board controlling the display layer are combined into a first printed circuit board, such that only one flexible printed circuit board needs to be set up for the first printed circuit board, and the touch control circuit board and the display circuit board are electrically connected to the second printed circuit board within the host, which can effectively reduce costs.

Optionally, an orthographic projection of the first printed circuit board 21 on the light exit surface of the display panel 11 is disposed within the light exit surface of the display panel 11, and an area ratio of the orthographic projection of the first printed circuit board 21 on the light exit surface of the display panel 11 to the light exit surface of the display panel 11 is not less than 0.5.

As shown in FIG. 3, in the case that the first printed circuit board is combined by the touch circuit board and the display circuit board, the size of the first printed circuit board is larger, and the ratio of the area of the orthographic projection of the first printed circuit board on the light exit surface of the display panel to the light exit surface of the display panel is not less than 0.5, that is, the first printed circuit board covers at least one-half of the light exit surface of the display panel.

Optionally, at least one of the light exit surface of the display panel 11, the surface of the first connecting portion 31, and the surface of the second connecting portion 32 has a hand-tearable adhesive film 70.

The hand-tearable adhesive film is a double-side adhesive film, and a surface of the double-side adhesive film is covered by the hand-tearable film. The area of the hand-tearable film is larger than an area of the double-side adhesive film, such that a portion of the hand-tearable film to is outside the double-side adhesive film.

In some embodiments of the present disclosure, the light exit surface of the display panel 11, the surface of the first connecting portion 31 and the surface of the second connecting portion 32 are provided with the hand-tearable adhesive film 70.

Figure 17:
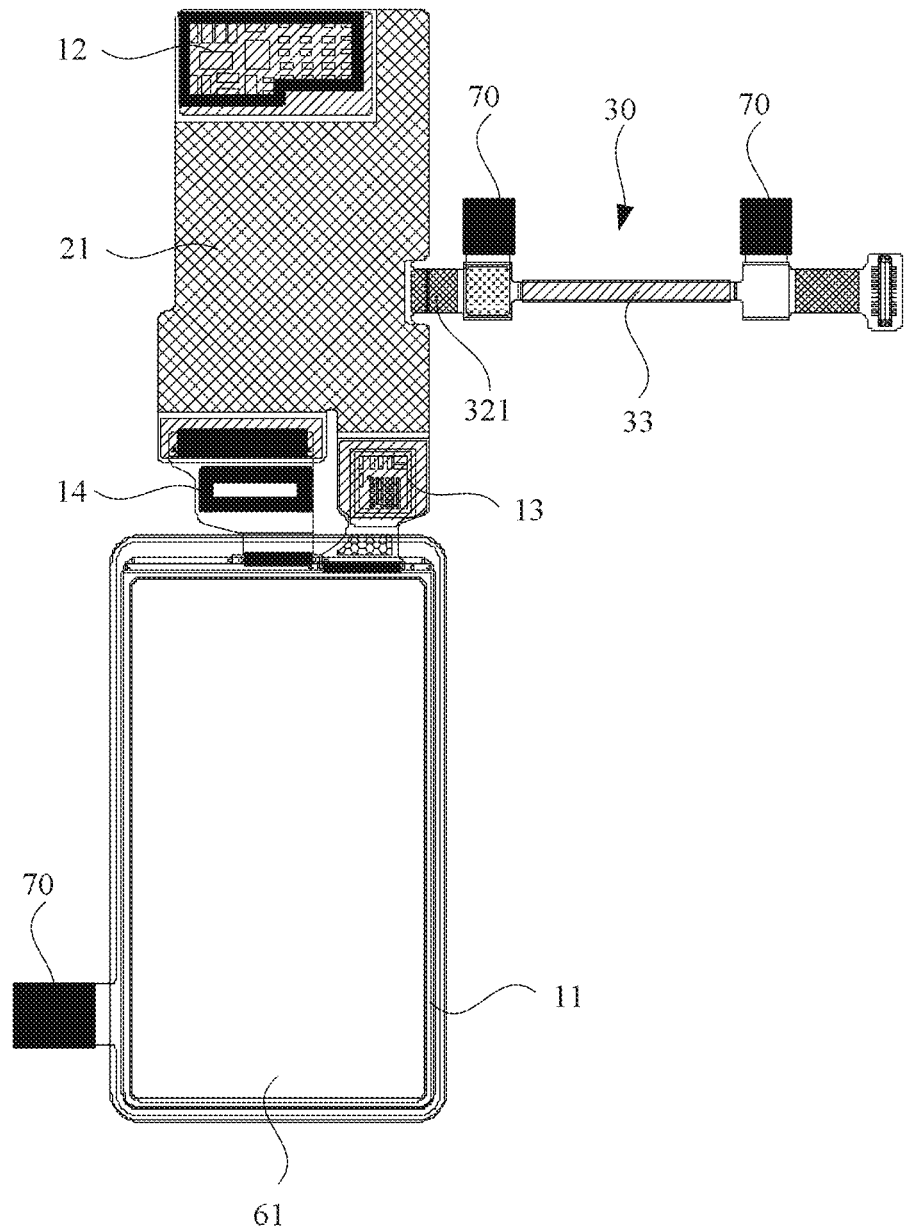
FIG. 17 is a schematic diagram of a display module in an unfolded state according to some embodiments of the present disclosure.
Figure 18:
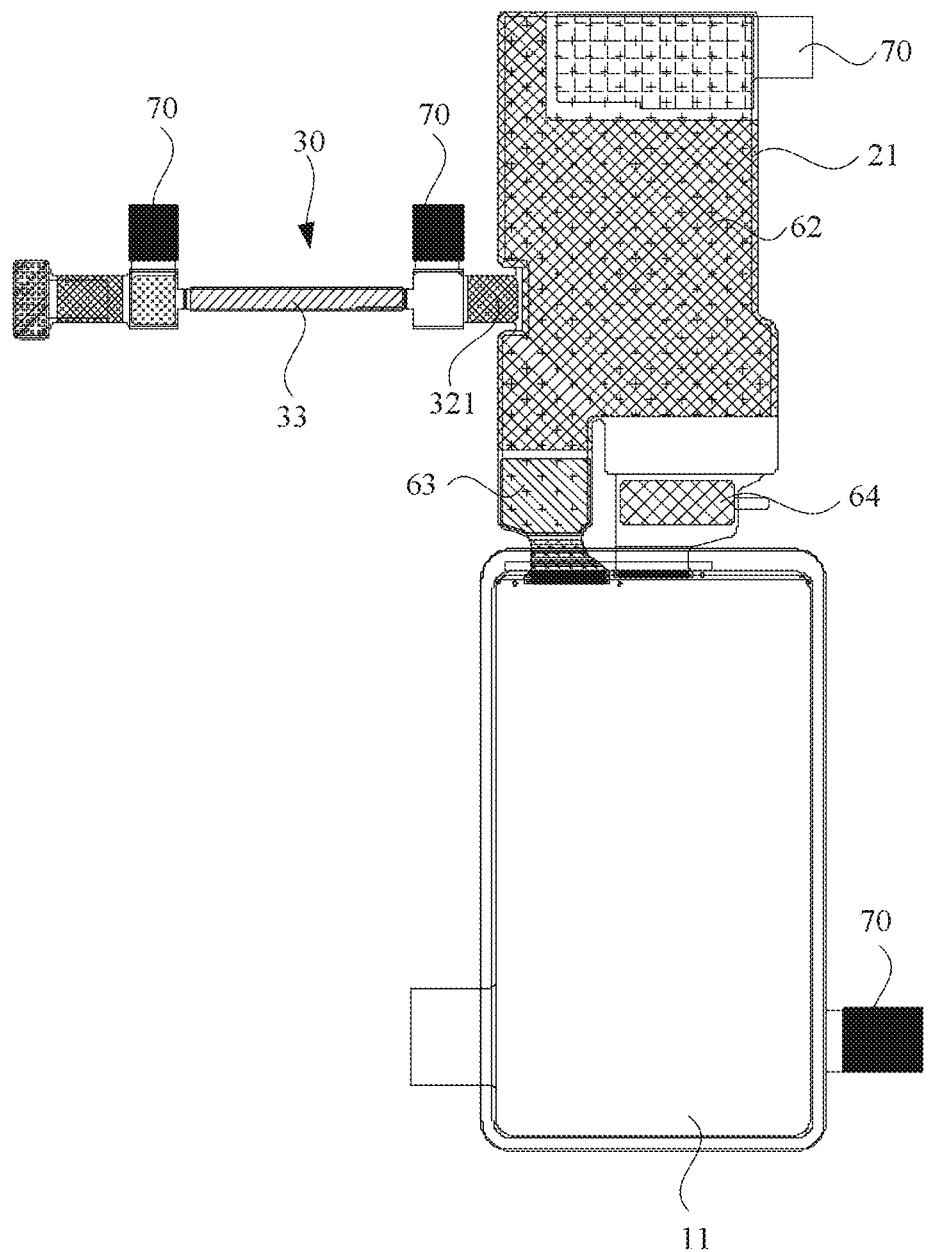
FIG. 18 is a schematic diagram of another display module in an unfolded state according to some embodiments of the present disclosure.

FIG. 17 is a schematic diagram of a display module in an unfolded state according to some embodiments of the present disclosure. FIG. 18 is a schematic diagram of another display module in an unfolded state according to some embodiments of the present disclosure. FIG. 17 illustrates an unfolded view of the light exit surface of the display panel facing the paper surface, and FIG. 18 illustrates an unfolded view of a back surface of the display panel facing the paper surface.

Exemplarily, as shown in FIG. 17, the hand-tearable adhesive film 70 is fixed to the light exit surface of the display panel 11, and the hand-tearable adhesive film 70 is disposed on the glass cover 61 of the display panel, and the hand-tearable adhesive film 70 is configured to protect the display panel.

Exemplarily, as shown in FIGS. 17, 18, the hand-tearable adhesive film 70 is provided on the surface of the first connecting portion 31 and the surface of the second connecting portion 32.

In conjunction with FIGS. 15, 16, the hand-tearable adhesive film 70 disposed on the first connecting portion 31 is configured to be removed after the flexible printed circuit board is folded, and. The first connecting portion 31 is fixed to the first printed circuit board 21 by double-side adhesive film, such that the connection reliability of the flexible printed circuit board and the first printed circuit board 21 is improved.

The hand-tearable adhesive film 70 disposed on the second connecting portion 32 is configured to be removed after the flexible printed circuit board is folded, and. The second connecting portion 32 is fixed to the first printed circuit board 21 by double-side adhesive film, such that the connection reliability of the flexible printed circuit board and the first printed circuit board 21 is improved.

Optionally, as shown in FIG. 18, the display module 10 further includes a driver integrated circuit (IC) 14, which is configured to drive the display panel 11 to display an image.

The display panel may be an Organic Light-Emitting Diode (OLED) panel, a Liquid Crystal Display (LCD) panel, a Quantum Dot Light Emitting Diodes (QLED) panel or a display panel composed of other display structures.

As shown in FIG. 18, the first printed circuit board 21 is provided with a main screen driver chip 12 and a touch driver chip 13, wherein the main screen driver chip is configured to control the screen display of the display panel 11, and the touch control driver chip 13 is configured to control the touch control of the display panel.

As shown in FIGS. 17 and 18, the first printed circuit board 21 is connected to the display panel 11 by a Chip On Film (COF) process to enable the main screen driver chip 12 to be connected to the display panel 11 for to realize the control of the screen display, and also to enable the touch driver chip 13 to be connected to the display panel 11 to realize the touch control function of the display panel 11.

The driver IC is disposed on the chip on film C, and the driver IC is folded to the backlight side of the display panel 11 via the chip on film C to reduce the devices arranged on the light exit surface of the display panel 11 to realize a full-screen display.

As shown in FIG. 17, the display module 10 further includes a casing and a glass cover plate 61, the casing and the glass cover plate 61 enclosing a cavity, and the display panel 11 and the first printed circuit board 21 are disposed in the cavity to protect the display panel 11. The glass cover plate 61 is disposed on the light exit surface of the display panel 11 to transmit light.

An opening is provided in the casing, and the opening is coaxially connected to one end of the hollow rotation shaft, such that the flexible printed circuit board 30 enters the cavity through the opening to and is electrically connected to the first printed circuit board 21 of the display module.

Optionally, as shown in FIGS. 3, 18, the first printed circuit board 21 is provided with a PI adhesive layer 62 on the surface of the first printed circuit board 21 facing the display panel 11 after the first printed circuit board 21 is folded, and the strength of the first printed circuit board 21 is enhanced by providing the PI adhesive layer 62.

Optionally, as shown in FIG. 18, the surface of the first printed circuit board 21 facing the display panel may be provided with a steel sheet 63 at a position corresponding to the touch driver chip 13, to reinforce the strength of the first printed circuit board 21 to enhance the connection reliability of the touch driver chip 13.

Optionally, as shown in FIG. 18, the first printed circuit board 21 faces the surface of the display panel. A foam 64 is provided at a position corresponding to the driver integrated circuit 14, and the driver integrated circuit 14 is supported by the foam 64.

Embodiments of the present disclosure provide a display device, as shown in FIG. 2, the display device includes a host 5 and a display module 10 as previously described.

The display device further includes a hollow rotation shaft 50, one end of the hollow rotation shaft 50 is connected to the display module 10, the other end of the hollow rotation shaft 50 is movably mounted on the host 5, and a connecting band 33a is disposed within the hollow rotation shaft 50.

The hollow rotation shaft 50 is disposed between the display module 10 and the host 5, such that one end of the hollow rotation shaft 50 is connected to the display module 10, and the other end of the hollow rotation shaft 50 is circumferentially movably mounted on the host 5. In this way, by driving the hollow rotation shaft 50 to rotate, the purpose of controlling the display module 10 to rotate relative to the host 5 is achieved.

The hollow rotation shaft 50 has an inner hole extending from one end to the other end, and the inner hole is provided for the flexible printed circuit board 30 to run through, such that the flexible printed circuit board 30 enters into the host 5 through the hollow rotation shaft 50 and is connected to the second printed circuit board 22 in the host 5.

By providing the hollow rotation shaft 50 for mounting the flexible printed circuit board 30, the flexible printed circuit board 30 can be hidden to facilitate wiring, and the hollow rotation shaft 50 can also protect the flexible printed circuit board 30.

It should be noted that, as shown in FIGS. 15 and 16, in the case that the display module is assembled with the host, the hand-tearable adhesive film in the display module is removed. That is, when using the display module, the hand-tearable adhesive film is not present in the display module.

Optionally, as shown in FIG. 2, the display device further includes a motor 51. The motor 51 is disposed in the host 5, and the output shaft of the motor 51 is transmitted to the hollow rotation shaft 50.

Exemplarily, as shown in FIG. 2, the output shaft of the motor 51 and the hollow rotation shaft 50 are both equipped with gears 53, and the two gears 53 are meshed, such that the purpose of driving the hollow rotation shaft 50 to rotate can be achieved by controlling the rotation of the motor 51.

By placing the motor 51, which is larger in size and mass, within the host 5, the component driven by the motor 51 is only the display module 10. The energy consumption when controlling the rotation of the display device can be effectively reduced by reducing the total weight of the components driven by the motor 51.

Optionally, the display device further includes a power supply 52. The power supply 52 is disposed within the host 5 and is electrically connected to the motor 51. Providing the power supply 52 also within the host 5 reduces the total weight of the components driven by the motor 51 and further reduces the energy consumption when controlling the rotation of the display device.

Optionally, as shown in FIG. 2, the host 5 includes a casing in which the second printed circuit board 22 for connecting with the flexible printed circuit board 30 is mounted. The casing is configured to accommodate components of larger size and mass, such as the motor 51 and the power supply 52 described previously.

In the embodiments of the present disclosure, the display device may be a phone, a tablet computer, a monitor, a digital photo frame, and any other terminal having a display function.

By fixing the host 5 of the display device on a stand, the mobile terminal automatically controls the motor 51 to drive the hollow rotation shaft to rotate, the display module 10 is controlled to rotate relative to the host 5, such that the display device realizes the switching of the horizontal or vertical screen. Compared to controlling the rotation of the whole display device, the display device only needs to control the rotation of the display module 10, which has a simpler and lighter structure, and thus meets the needs of use while also reducing the energy consumption of controlling the rotation of the display device.

The above is not a formal limitation of the present disclosure, although the present disclosure has been disclosed by embodiments, however, it is not intended to limit the present disclosure, and any skilled person familiar with the profession, without departing from the scope of the technical solutions of the present disclosure, when the technical contents of the above disclosure can be utilized to make some changes or modifications to equivalent embodiments of the same changes, any simple modifications, equivalent changes and modifications to the above embodiments based on the technical substance of the present disclosure, without departing from the technical program of the present disclosure, still fall within the scope of the technical program of the present disclosure.

What is claimed is:

1. A display module, configured to be rotatably connected to a host, the display module comprising: a display panel, a first printed circuit board, and a flexible printed circuit board;
    wherein the display panel is electrically connected to the first printed circuit board, the first printed circuit board is disposed at a back of the display panel, and the flexible printed circuit board comprises a first connecting portion, a second connecting portion, and a flexible connecting structure, wherein the flexible connecting structure comprises a plurality of stacked connecting bands, two ends of the flexible connecting structure are connected to the first connecting portion and the second connecting portion respectively, the first connecting portion is connected to the first printed circuit board, and the second connecting portion is configured to be connected to the host; and
    each of the connecting bands has a first side face and a second side face, a thinning groove is disposed in the first side face of at least one of the connecting band, and the first side face of the connecting bands is opposite to the second side face of an adjacent connecting band in a stacking direction.

2. The display module according to claim 1, wherein a ratio of a length of the thinning groove to a length of the connecting band ranges from 0.6 to 0.9.

3. The display module according to claim 1, wherein a width of the thinning groove is equal to a width of the connecting band.

4. The display module according to claim 1, wherein a ratio of a depth of the thinning groove to a thickness of the connecting band ranges from 0.3 to 0.7.

5. The display module according to claim 1, wherein in response to the flexible printed circuit board being in an unfolded state, the connecting bands are spaced apart in parallel, and each of the connecting bands has a same shape and area.

6. The display module according to claim 5, wherein the flexible connecting structure is linear, and the flexible connecting structure runs through a line connecting a geometric center of the first connecting portion to a geometric center of the second connecting portion.

7. The display module according to claim 5, wherein the flexible connecting structure is in a fan ring shape, and a middle region of the flexible connecting structure is outside a line connecting a geometric center of the first connecting portion to a geometric center of the second connecting portion.

8. The display module according to claim 1, wherein
    the first connecting portion and the second connecting portion are formed by folding connecting side plates;
    in response to the flexible printed circuit board being in an unfolded state, a length direction of the connecting side plate is perpendicular to an arrangement direction of the first connecting portion and the second connecting portion, and the connecting side plate has a plurality of folding regions sequentially connected in the length direction, the plurality of folding regions are in one-to-one correspondence to the plurality of connecting bands, and each of the folding regions is connected to a corresponding connecting band thereof; and
    the plurality of folded regions are stacked in response to the flexible printed circuit board being in a folded state.

9. The display module according to claim 8, wherein a ratio of a width of the connecting band to a width of the folded region to which the connecting band is connected ranges from 0.3 to 0.7.

10. The display module according to claim 8, wherein
    each of the first connecting portion and the second connecting portion further comprises a connecting structure, wherein the connecting structure and the connecting band are disposed on opposite sides of the connecting side plate respectively; and
    the display module further comprises a connector disposed on the connecting structure of the second connecting portion, wherein the connector is configured to be connected to a second printed circuit board within the host.

11. The display module according to claim 10, wherein the connecting structure comprises a connecting plate and two clamping plates spaced apart in parallel, wherein the connecting plate is disposed between the two clamping plates and two sides of the connecting plate are connected to the two clamping plates respectively, the connector is disposed between the two the clamping plates and is connected to one of the two clamping plates, and the second printed circuit board is disposed between the two clamping plates.

12. The display module according to claim 11, wherein
the flexible printed circuit board comprises a first conductive layer, an insulative layer, and a second conductive layer that are stacked sequentially in a thickness direction; and
at least part of a region of the connecting structure of the first conductive layer or the second conductive layer is in a mesh shape.

13. The display module according to claim 1, wherein the flexible printed circuit board further comprises a protective layer, wrapped around the plurality of connecting bands.

14. The display module according to claim 1, wherein the first printed circuit board and the flexible printed circuit board are integrally formed.

15. The display module according to claim 14, wherein the first connecting portion is connected to a side edge of the first printed circuit board.

16. The display module according to claim 1, wherein the display panel has a touch layer and a display layer, and the first printed circuit board comprises a display circuit and a touch circuit, wherein the display circuit is electrically connected to the display layer, and the touch circuit is electrically connected to the touch layer.

17. The display module according to claim 16, wherein an orthographic projection of the first printed circuit board on a light exit surface of the display panel is within a light exit surface of the display panel, and a ratio of an area of the orthographic projection of the first printed circuit board on the light exit surface of the display panel to the light exit surface of the display panel is not less than 0.5.

18. The display module according to claim 1, wherein at least one of a light exit surface of the display panel, a surface of the first connecting portion, and a surface of the second connecting portion has a hand-tearable adhesive film.

19. A display device, comprising: a host and a display module;
wherein the display module comprises: a display panel, a first printed circuit board, and a flexible printed circuit board; wherein the display panel is electrically connected to the first printed circuit board, the first printed circuit board is disposed at a back of the display panel, and the flexible printed circuit board comprises a first connecting portion, a second connecting portion, and a flexible connecting structure, wherein the flexible connecting structure comprises a plurality of stacked connecting bands, two ends of the flexible connecting structure are connected to the first connecting portion and the second connecting portion respectively, the first connecting portion is connected to the first printed circuit board, and the second connecting portion is configured to be connected to the host;
wherein each of the connecting bands has a first side face and a second side face, a thinning groove is disposed in the first side face of at least one of the connecting band, and the first side face of the connecting bands is opposite to the second side face of an adjacent connecting band in a stacking direction; and
wherein the display device further comprises a hollow rotation shaft, one end of the hollow rotation shaft is connected to the display module, the other end of the hollow rotation shaft is movably mounted on the host, and the connecting band is disposed within the hollow rotation shaft.

* * * * *